US012598065B2

(12) United States Patent
Kashtan et al.

(10) Patent No.: US 12,598,065 B2
(45) Date of Patent: Apr. 7, 2026

(54) MANAGING DATA ENCRYPTION DURING SYSTEM UPGRADES

(71) Applicant: RED HAT, INC., Raleigh, NC (US)

(72) Inventors: Yuval Kashtan, Westford, MA (US); David Elie-Dit-Cosaque, Austin, TX (US); James Ramsay, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 48 days.

(21) Appl. No.: 18/660,445

(22) Filed: May 10, 2024

(65) Prior Publication Data

US 2025/0350452 A1 Nov. 13, 2025

(51) Int. Cl.
*H04L 9/08* (2006.01)
*G06F 9/4401* (2018.01)

(52) U.S. Cl.
CPC ............ *H04L 9/088* (2013.01); *G06F 9/4401* (2013.01)

(58) Field of Classification Search
CPC ............................... H04L 9/088; G06F 9/4401
See application file for complete search history.

(56) References Cited

U.S. PATENT DOCUMENTS

| | | | | |
|---|---|---|---|---|
| 8,560,823 | B1 * | 10/2013 | Aytek | G06F 8/654 |
| | | | | 713/2 |
| 2011/0072266 | A1 * | 3/2011 | Takayama | G06F 21/445 |
| | | | | 713/168 |
| 2017/0060595 | A1 * | 3/2017 | Keidar | H04L 9/30 |
| 2019/0007204 | A1 * | 1/2019 | Field | H04L 9/0894 |
| 2021/0012011 | A1 * | 1/2021 | Huang | G06F 21/79 |

* cited by examiner

*Primary Examiner* — Mohammad W Reza
(74) *Attorney, Agent, or Firm* — Kilpatrick Townsend & Stockton LLP

(57) ABSTRACT

A system can be provided for managing data encryption during system updates. For example, the system can detect an upgrade to a component of a computing device that includes encrypted data. In response to detecting the upgrade and prior to a boot process the system can deactivate a link between a set of platform configuration register (PCR) values and a decryption key usable to decrypt the encrypted data. The system can further authorize access to the decryption key during the boot process by provisioning an alternative link between a network server and the decryption key. Additionally, subsequent to the boot process, the system can update the set of PCR values and link the updated set of PCR values and the decryption key.

20 Claims, 3 Drawing Sheets

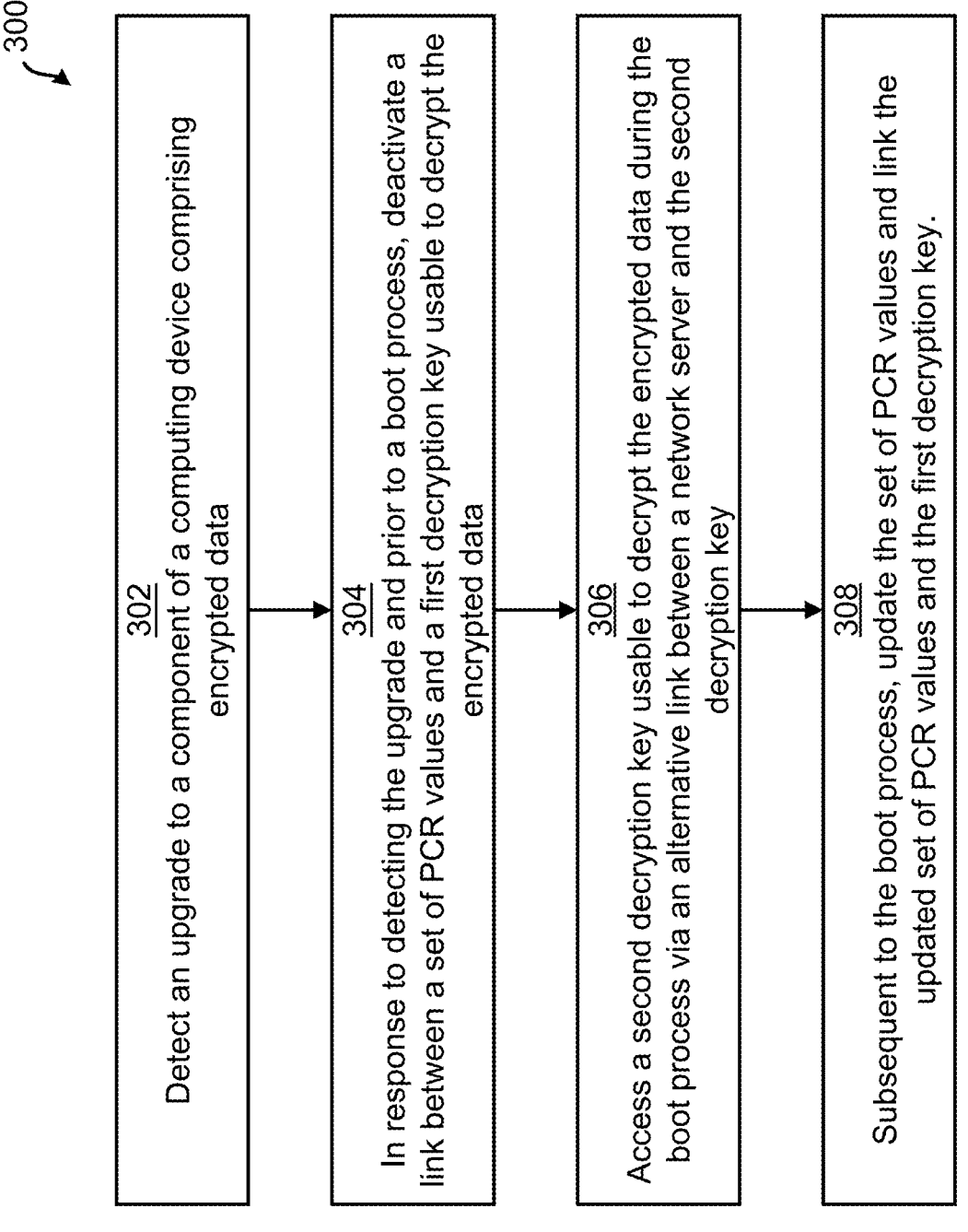

300

302
Detect an upgrade to a component of a computing device comprising encrypted data 304
In response to detecting the upgrade and prior to a boot process, deactivate a link between a set of PCR values and a first decryption key usable to decrypt the encrypted data 306
Access a second decryption key usable to decrypt the encrypted data during the boot process via an alternative link between a network server and the second decryption key 308
Subsequent to the boot process, update the set of PCR values and link the updated set of PCR values and the first decryption key.

FIG. 3

MANAGING DATA ENCRYPTION DURING SYSTEM UPGRADES

TECHNICAL FIELD

The present disclosure relates generally to cryptography and data security and, more particularly (although not necessarily exclusively), to managing data encryption during system upgrades.

BACKGROUND

Computer security has become increasingly important. To assist with various facets of computer security, trusted platform modules have been developed. A trusted platform module is a physical hardware chip that includes a secure cryptographic processor, which can be a dedicated microcontroller designed to secure hardware through integrated cryptographic keys. The cryptographic processor can include a random number generator, a RSA key generator, a SHA-1 hash generator, an encryption-decryption-signature engine, or any combination of these. Trusted platform modules can also include persistent memory and versatile memory. The persistent memory may include an endorsement key and a storage root key (SRK). The versatile memory may include platform configuration registers, attestation identity keys, and storage keys. Trusted platform modules can be built-in to computing devices, for example as a part of the motherboard or another hardware component of a desktop computer, laptop computer, or server.

BRIEF DESCRIPTION OF THE DRAWINGS

FIG. 3 shows a flow chart of an example of a process for managing data encryption during system upgrades according to some aspects of the present disclosure.

DETAILED DESCRIPTION

Figure 1:
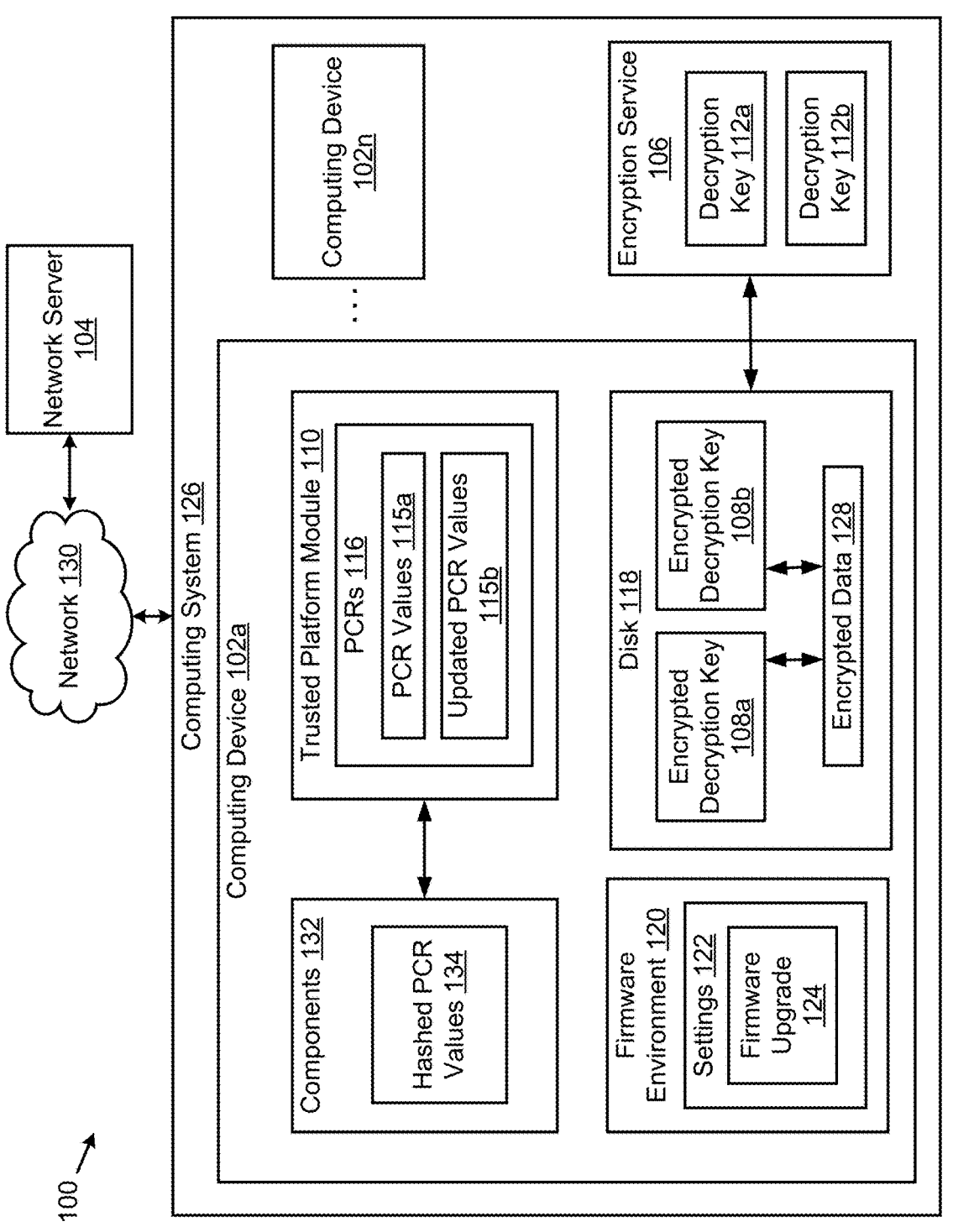
FIG. 1 shows a block diagram of an example of a system for managing data encryption during system upgrades according to some aspects of the present disclosure.

There can be many situations in which it may be beneficial to encrypt sensitive information such as passwords and personally identifiable information (PII) on a computing system. As one example, data stored on a disk of a computing device can be encrypted to protect the data if, for example, the computing device is lost or stolen. Disk encryption systems, such as those integrated with a trusted platform module, may use platform configuration registers (PCRs) to store hash values that represent a trusted and secure state of the computing device. The hash values can be associated with components of the computing device such as firmware, a bootloader, an operating system loader, configuration files, or the like. During a boot process of the computing device, the disk encryption systems can check current hash values against the hash values stored in the PCRs before decrypting the data on the disk. In this way, the disk encryption systems can ensure the computing device boots in the trusted and secure state. But, an upgrade to an operating system, firmware, hardware, or to another suitable component of the computing device may change a configuration of the components of the computing device, which can affect the hash values corresponding to the components. As a result, upon a subsequent boot process at the computing device, the hash values may not match the hash values stored in the PCRs. This may prevent automatic decryption of the encrypted data, halt the boot process, lock authorized users out of the computing device, or a combination thereof.

Some examples of the present disclosure can overcome one or more of the abovementioned problems by a system that can manage data encryption during system upgrades. For example, after upgrading an aspect of a computing device, a boot process may be executed to apply changes associated with the upgrade (e.g., changes to the configuration of the computing device). The system can detect the upgrade and, prior to the boot process, the system may unbind PCR values and disk decryption (e.g., decryption of data stored on the disk). That is, the system can disable the dependency of disk decryption on the hash values of components matching the PCR values. The system may then utilize a temporary, alternative binding technique during the boot process to ensure the boot process is performed in a secure manner. For example, the system may implement network-based disk encryption during the boot process. After the changes to the computing device corresponding to the upgrade are implemented (e.g., after the boot process), the system can update the PCRs and rebind the PCRs and disk encryption. In this way, system upgrades can be carried out in a secure manner and without disrupting decryption techniques employed at the computing device. Additionally, due to the temporary alternative binding, automatic decryption of the encrypted data on the disk can be performed during a boot process following an upgrade, thereby preventing disruption to the boot process and facilitating access to the computing device for authorized users.

In a particular example, a computing device (e.g., a laptop) can be configured with full disk encryption using a trusted platform module (TPM). The decryption key for decrypting the disk can be bound (e.g., linked) to PCR values. The PCR values can be hash values corresponding to components of the computing device that are stored in PCRs and that represent a trusted state of the computing device. The PCR values can be stored and disk encryption can be managed at least in part by the TPM. For example, the TPM can store or encrypt the decryption key, and due to the binding of the PCR values and the decryption key, the TPM may release the decryption key when current hash values match the PCR values.

In the particular example, a firmware upgrade can be initiated by a user of the computing device to upgrade basic input/output firmware of the computing device. A system associated with the computing device can detect the firmware upgrade and, prior to the next boot process of the computing device, the system can deactivate the link between the PCR values and the decryption key. To do so, the system can prevent access to the decryption key stored by the TPM during the boot process. Substantially contemporaneous to deactivating the link, the system may activate or utilize an alternative link temporarily. The alternative link can be between a network server and another decryption key for decrypting the disk. The alternative link can involve configuring a network server to provide the other decryption key via a secure network connection between the computing device and the network server.

Thus, during the boot process, the system can receive and use the other decryption key to decrypt the disk. In this way, the system can facilitate decryption of the disk in a secure manner during the boot process. After the boot process, the system can update the PCR values and relink the decryption key with the updated PCR values. In doing so, the system can cause subsequent disk decryption to depend on the hash values of the components matching the updated PCR values.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 shows a block diagram of an example of a system 100 for managing data encryption during system upgrades according to some aspects of the present disclosure. The system 100 can include a computing system 126, which may include any number and combination of computing devices 102a-n. Examples of such computing devices 102a-n can include servers, desktop computers, laptop computers, mobile phones, wearable devices such as smart watches, networking hardware (e.g., gateways, firewalls, and routers), or any combination of these. In some examples, the computing system 126 can be a distributed computing system, such as a data grid or a computing cluster, in which the computing devices 102a-n can serve as nodes. The computing system 126 can be positioned at any suitable geographical location and may form any suitable part of a network infrastructure. For example, the computing system 126 can be an edge computing system positioned at a physical edge of a network infrastructure, or the computing system 126 can be a non-edge computing system positioned at a non-edge location of the network infrastructure.

The computing system 126 can include a computing device 102a with sensitive information. The sensitive information can be any information that is to be secured. The sensitive information may be manually selected by a user or programmatically selected by software (e.g., from among a group of information accessible to the computing device 102a). In some examples, there can be one or more types of sensitive information to be secured. Examples of such sensitive information can include usernames; passwords; PIN numbers; security tokens; secrets; security keys such as a secure shell (SSH) key; personally identifiable information (PII) such as names, social security numbers, credit card numbers, license numbers, passport numbers, address information, bank account information, and biometric information; or any combination of these. Another example of such sensitive information can include configuration data for at least some of the computing system 126 (e.g., the computing device 102a). In some examples, the configuration data can indicate a hardware configuration associated with the computing system 126, such as the hardware, hardware settings, and hardware topology of the computing system 126. Additionally or alternatively, the configuration data may indicate a software configuration associated with the computing system 126, such as the software, software settings, and software topology of the computing system 126. Other types of sensitive information may also be used. The computing device 102a may obtain the sensitive information using any suitable method. For example, the computing device 102a may generate the sensitive information or may receive the sensitive information from any suitable source, such as a database.

At least some of the sensitive information can be stored on a disk 118 of the computing device 102a. To secure the sensitive information stored on the disk 118, the computing device 102a can utilize any suitable cryptographic method to convert the sensitive information into encrypted data 128. For example, a cryptographic key can be used to encrypt the sensitive information to generate the encrypted data 128. One or more decryption keys can be used to decrypt the encrypted data 128. To provide an additional layer of security, the decryption keys can be encrypted and stored as encrypted decryption keys 108a-b on the disk 118. A trusted platform module (TPM) 110 can then be used to secure a first decryption key 112a, which can be used to decrypt a first encrypted decryption key 108a and, in turn, decrypt the encrypted data 128. The TPM 110 can further secure the first decryption key 112a with platform configuration registers (PCRs) 116.

To secure the first decryption key 112a with the PCRs 116, the TPM 110 can compute hash values for a trusted state of the computing device 102a. The hash values for the trusted state can be referred to as PCR values 115a. The TPM 110 can further store each of the PCR values 115a in a PCR. At boot time of the computing device 102a, the TPM 110 can calculate each PCR value by inputting data for a component of the computing device 102a into a hash function. The hash function can be configured to output each PCR value based on the data. The PCR values 115a output by the hash function can be unique strings of characters, which serve as unique digital representations of each of the components 132. The components 132 of the computing device 102a for which PCR values 115a may be calculated can include firmware, a bootloader, an operating system kernel, software applications or drivers, or the like.

In some examples, after the PCR values 115a are stored in the PCRs 116, the TPM 110 can use the PCR values 115a to ensure the computing device 102a is in the trusted state before providing access to the first decryption key 112a to an encryption service 106 of the computing system 126. For example, during a boot process, the encryption service 106 can retrieve the first encrypted decryption key 108a from the disk 118. The first encrypted decryption key 108a may be stored on the disk 118 using a Linux unified key setup (LUKS). If, during the boot process, hashed PCR values 134 for components 132 of the computing device 102a match expected values (e.g., the PCR values 115a), the TPM 110 can provide the first decryption key 112a to the encryption service 106. The encryption service 106 can then decrypt the first encrypted decryption key 108a using the first decryption key 112a. If, during the boot process, a hashed PCR value does not match an expected value, the TPM 110 can deny access to the first decryption key 112. The hashed PCR values 134 can be hash values calculated for components 132 of the computing device 102a during a boot process for comparison to the PCR values 115a representative of the trusted state.

Thus, the TPM 110 and PCRs 116 can add a layer of security by tying decryption process of the disk 118 to the integrity of the computing device's 102a hardware and software configuration. However, in some examples, a component of the computing device 102a may be upgraded. The upgrade may affect the configuration of the computing device 102a, which may, in turn, alter hashed PCR values for one or more components. As a result, the TPM 110 may not provide access to the first decryption key 112a, which may lock an authorized user out of the computing device 102a. To enable access to the encrypted data 128 during and after an upgrade, the encryption service 106 can utilize alternative decryption methods.

For example, the encryption service 106 may detect an upgrade to a component of the computing device 102a. The encryption service 106 may further determine whether the upgrade to the component will change one or more of the PCR values 115a. That is, the encryption service 106 may determine whether the upgrade will change a hash value calculation for a component associated with one of the PCR values 115a. Examples of components that may be upgraded can include a basic input/output system, a unified extensible firmware interface (UEFI), a bootloader, an operating system kernel, drivers, configuration files, extension firmware, software applications, etc. Upgrades to any of these components may impact corresponding PCR values. Additionally, examples of upgrades to components that may impact PCR values can include upgrades to firmware of particular hardware components. For example, upgrading firmware of network cards, storage controllers, graphic cards or the like of the computing device 102a can impact PCR values. Adding or removing hardware components may also impact PCR values.

In some examples, to detect an upgrade that may change PCR values, the encryption service 106 can access settings of a firmware environment 120 of the computing device 102a. In a particular example, the encryption service 106 can access a unified extensible firmware interface (UEFI), which can include settings or variables which may indicate operations the firmware of the computing device 102a may perform during a next boot process. In the particular example, the encryption service 106 can detect that a 'next_ boot' variable in the UEFI is set to execute 'fwupd', which can indicate that the there may be a firmware upgrade during the next boot process of the computing device 102a.

In response to detecting the upgrade, the encryption service 106 deactivate a link between PCR values 115a and the first decryption key 112a. As described above, the encryption service 106 can decrypt the first encrypted decryption key 108a upon receiving the first decryption key 112a from the TPM 110. Additionally, as described above, receiving the first decryption key 112a can depend on the TPM 110 determining that current hash values for components match the PCR values 115a. The dependency of access to the first decryption key 112a on the PCR values can generate the link between the PCR values 115a and the first decryption key 112a. Thus, deactivating the link can include preventing access for the encryption service 106 to the first decryption key 112a regardless of current hash values.

The encryption service 106 may deactivate the link between the PCR values 115a and the first decryption key 112a prior to a boot process associated with the upgrade. The boot process can include shutting down the computing device 102a, rebooting the computing device 102a, or a combination thereof. The boot process can be performed in accordance with or subsequent to the upgrade to apply the changes associated with the upgrade. The boot process may be performed automatically upon initiation or completion of the upgrade, or the boot process may be initiated by a user of the computing device 102a.

Additionally, the encryption service 106 can access a second decryption key 112b during the boot process associated with the upgrade using an alternative link. The second decryption key 112b can be used to decrypt a second encrypted decryption key 108b. The second encrypted decryption key 108b can then be used to decrypt the encrypted data 128. In some examples, the encryption service 106 can utilize network-based disk encryption to access to the second decryption key 112b the boot process. For example, a network server 104 (e.g., a tang server) can store the second decryption key 112b (e.g., an asymmetric key) for decrypting the second encrypted decryption key 128b. Thus, access to the second decryption key 112b during the boot process can be dependent upon access of the computing device 102a to the network server 104 via a specific network (e.g., network 130). The network 130 can be a local area network (LAN), wide area network (WAN), a virtual private network (VPN), a cloud-based network, or the like. The encryption service 106 and the network server 104 can be communicatively coupled via the network 130.

Therefore, in some examples, upon detecting that the first encrypted decryption key 108a cannot be decrypted (e.g., due to the link between the PCR values 115a and the first decryption key 112a being deactivated), the encryption service 106 can retrieve the second encrypted decryption key 108b from the disk. The encryption service 106 can then use the second decryption key 112b received from the network server 104 to decrypt the second encrypted decryption key 108b, and, in turn, decrypt the encrypted data 128. The decryption of the encrypted data 128 on the disk 118 using the second decryption key 112b from the network server 104 can enable the boot process to be carried in a secure manner and without dependency on the PCR values 115a that may be altered with the upgrade.

Additionally or alternatively, the encryption service 106 may configure the TPM 110 to provide access to the first decryption key 112a based on a subset of the PCR values 115a. For example, the encryption service 106 may determine, based on the type of upgrade, that the subset of the PCR values 115a may not be altered by the upgrade. In a particular example, a firmware upgrade may affect PCR values associated with firmware but may not affect PCR values associated with components loaded after the firmware such as an operating system kernel. Thus, the encryption service 106 may configure the TPM 110 to compute hashed PCR values for components associated with the subset of the PCR values 115a during the boot process. Then, based on the hashed PCR values matching the subset of the PCR values 115a, the TPM 110 can release the first decryption key 112a. The encryption service 106 can therefore receive access to the first decryption key 112a during the boot process associated with the upgrade. Alternatively, in some examples, the encryption service 106 can provide or compute a new set of PCR values for the TPM 110 to check in place of the PCR values 115a.

After the boot process, the encryption service 106 can detect updates to the PCR values 115a by corresponding software components of the computing device 102a. As a result, the updated PCR values 115b can be generated and stored in the TPM 110. In one example, the TPM 110 may recalculate the PCR values for the trusted state of the computing device 102a. That is, the TPM 110 can recalculate each PCR value by inputting data for each component of the computing device 102a into the hash function. The encryption service 106 may then relink the updated PCR values 115b and the first decryption key 112a. In some examples, after the computing device 102a boots using the second decryption key 112b, the subset of PCR values, or the new PCR values, the encryption service 106 may detect the use of the second decryption key 112b, the subset of PCR values, or the new PCR values in the boot process. As a result, the encryption service 106 can access the updated PCR values 115b and link the updated PCR values 115b and the first decryption key 112a. The encryption service 106 can link the updated PCR values 115b and the first decryption key 112a by configuring the TPM 110 to provide access to the first decryption key 112a upon determining that hashed PCR values 134 for the components 132 match the updated PCR values 115b.

Figure 2:
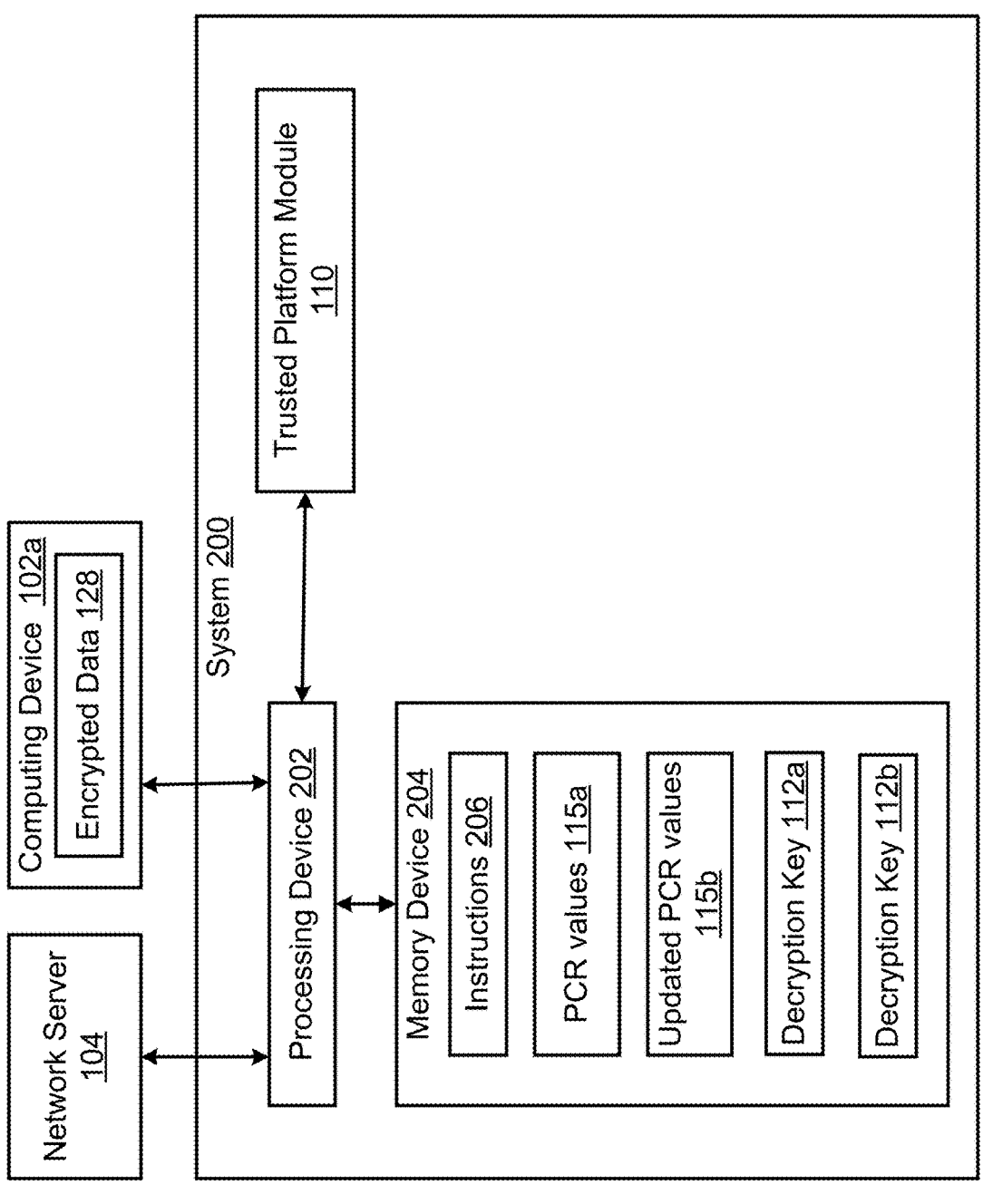
FIG. 2 shows a block diagram of another example of a system for managing data encryption during system upgrades according to some aspects of the present disclosure.

FIG. 2 shows a block diagram of another example of a system 200 for managing data encryption during system upgrades according to some aspects of the present disclosure. The system 200 includes a processing device 202 communicatively coupled to a memory device 204 and a trusted platform module 110. In some examples, the processing device 202, the memory device 204, and/or the trusted platform module 110 can be part of the same computing device, such as computing device 102a of FIG. 1. In other examples, the processing device 202, the memory device 204, and/or the trusted platform module 110 can be distributed from (e.g., remote to) one another.

The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions 206 stored in the memory device 204 to perform operations. The instructions 206 may include processor-specific instructions generated by a compiler or an interpreter from code written in any suitable computer-programming language, such as C, C++, C#, etc.

The memory device 204 can include one memory or multiple memories. The memory device 204 can correspond to the disk 118 depicted in FIG. 1. The memory device 204 can be non-volatile and may include any type of memory that retains stored information when powered off. Non-limiting examples of the memory device 204 include electrically erasable and programmable read-only memory (EE-PROM), flash memory, or any other type of non-volatile memory. At least some of the memory device 204 can include a non-transitory computer-readable medium from which the processing device 202 can read instructions 206. A computer-readable medium can include electronic, optical, magnetic, or other storage devices capable of providing the processing device 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

The processing device 202 can execute the instructions 206 to perform operations. For example, the processing device 202 can detect an upgrade to a component (e.g., hardware, software, firmware) of a computing device 102a. The computing device 102a can include encrypted data 128. In response to detecting the upgrade and prior to a boot process, the processing device 202 can deactivate a link between a set of platform configuration register (PCR) values 115a and a first decryption key 112a usable to decrypt the encrypted data 128. The processing device 202 can further access a second decryption key 112b usable to decrypt the encrypted data 128 during the boot process via an alternative link between a network server 104 and the second decryption key 112b. Additionally, subsequent to the boot process, the processing device 202 can update the set of PCR values 115a and link the updated set of PCR values 115b and the first decryption key 112a.

FIG. 3 shows a flow chart of an example of a process for managing data encryption during system upgrades according to some aspects of the present disclosure. In some examples, the processing device 202 can perform one or more of the steps shown in FIG. 3. For example, the processing device 202 can execute the encryption service 106 of FIG. 1 to perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIGS. 1-2.

At block 302, the processing device 202 can detect an upgrade to a component (e.g., hardware, software, firmware) of a computing device 102a. The computing device 102a can include encrypted data 128, which may be stored on a disk 118. The encrypted data 128 can be decrypted using any one of encrypted decryption keys 108a-b. In an example, the upgrade can be a firmware upgrade 124. To detect the firmware upgrade 124, the processing device 202 can access a firmware environment 120 of the computing device 102a (e.g., a unified extensible firmware interface (UEFI)), which can include settings 122. The settings 122 may indicate operations that components of the computing device 102a may perform during a next shutdown and reboot (e.g., a next boot process). Thus, the processing device 202 may detect that a firmware upgrade 124 is to be performed upon the next boot process of the computing device 102a based on the settings 122.

At block 304, the processing device 202 can, in response to detecting the upgrade and prior to a boot process, deactivate a link between a set of platform configuration register (PCR) values 115a and a first decryption key 112a usable to decrypt the encrypted data 128. The first decryption key 112a may be usable to decrypt a first encrypted decryption key 108a. Thus, by being usable to decrypt the first encrypted decryption key 108a, the first decryption key 112a can be used to decrypt the encrypted data 128a. The boot process can include shutting down the computing device 102a, rebooting the computing device 102a, or a combination thereof. In the example, the boot process can be performed in accordance with the firmware upgrade 124 to apply the changes associated with the firmware upgrade 124.

The link between the PCR values 115a and the first decryption key 112a can be managed by a trusted platform module (TPM) 110. For example, the TPM 110 can store the first decryption key 112a and may render the first decryption key 112a inaccessible by an operating system of the computing device 102a until one or more conditions are met. The conditions may include current hash values computed for components of the computing device 102a matching PCR values 115a. Thus, the first decryption key 112a and PCR values 115a can be linked such that access to the first decryption key 112a is dependent upon the PCR values 115a. To deactivate the link between the PCR values 115a and the first decryption key 112a, the processing device 202 can configure the TPM 110 to prevent access to the first decryption key 112a during the boot process. Additionally, to deactivate the link, the processing device 202 may configure a second decryption key 112b temporarily, which can be used to decrypt the encrypted data 128. The second decryption key 112b can be configured prior to the upgrade and can be used to decrypt the encrypted data 128 during the boot process associated with the upgrade in place of the first decryption key 112a.

At block 306, the processing device 202 can access a second decryption key 112b usable to decrypt the encrypted data 128 during the boot process via an alternative link between a network server 104 and the second decryption key 112b. In the example, the processing device 202 can access the second decryption key 112b via the alternative link using a network connection between the computing device 102a and the network server 104. As a result, access to the second decryption key 112b during the boot process can be dependent upon the computing device 102*a* being communicatively coupled with the network server 104 via a specific network (e.g., network 130).

Additionally or alternatively, the processing device 202 can facilitate access to first decryption key 112*a* during the boot process associated with the upgrade. For example, the processing device 202 can configure the TPM 110 to provide access to the first decryption key 112 based on a subset of the PCR values 115*a*. In the example, the processing device 202 may determine that the subset of the PCR values 115*a* will not be altered by the firmware upgrade. For example, PCR values associated with components loaded after the firmware, such as an operating system kernel, may not be affected by the firmware upgrade 124. Thus, during the boot process, the processing device 202 may configure the TPM 110 to compute hash values for components associated with the subset of the PCR values 115*a*. Then, based on the hash values matching the subset of the PCR values 115*a*, the TPM 110 can release the first decryption key 112*a*.

At block 308, the processing device 202 can, subsequent to the boot process, update the set of PCR values 115*a* and link the updated set of PCR values 115*b* and the first decryption key 112*a*. In the example, to update the PCR values 115*a* the processing device 202 can recalculate the hash values for the trusted state of the computing device 102*a*. To do so, the processing device 202 may input data for each component of the computing device 102*a* into a hash function. The recalculated hash values can therefore be the updated PCR values 115*b*. In some examples, the processing device 202 may not recalculate the subset of PCR values. The processing device 202 can then link the updated PCR values 115*b* and the first decryption key 112*a* by configuring the TPM 110 to, during another boot process of the computing device 102*a*, provide access to the first decryption key 112*a* upon calculating hashed PCR values 134 for the components 132 and determining that the hashed PCR values 134 match the updated PCR values 115*b*.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device that includes instructions executable by the processing device for causing the processing device to perform operations comprising:
detecting an upgrade to a component of a computing device, wherein the computing device comprises encrypted data;
in response to detecting the upgrade and prior to a boot process, deactivating a link between a set of platform configuration register (PCR) values and a first decryption key usable to decrypt the encrypted data;
accessing a second decryption key usable to decrypt the encrypted data during the boot process via an alternative link between a network server and the second decryption key; and
subsequent to the boot process, updating the set of PCR values and linking the updated set of PCR values and the first decryption key.

2. The system of claim 1, wherein the operation of accessing the second decryption key via the alternative link comprises using a network connection between the computing device and the network server to access the second decryption key.

3. The system of claim 1, wherein the operation of linking the updated set of PCR values and the first decryption key comprises configuring a trusted platform module to provide access to the first decryption key upon determining that hashed PCR values associated with another boot process match the updated set of PCR values.

4. The system of claim 1, wherein the operation of deactivating the link between the set of PCR values and the first decryption key comprises preventing access to the first decryption key during the boot process.

5. The system of claim 1, wherein the operations further comprise determining that the upgrade to the component will affect at least one PCR value of the set of PCR values.

6. The system of claim 1, wherein the upgrade is a firmware upgrade, and wherein the operation of detecting the firmware upgrade comprises:
accessing at least one setting of a firmware environment associated with the computing device; and
determining, based on the at least one setting, that the firmware upgrade is scheduled for execution during the boot process.

7. The system of claim 1, wherein the operations further comprise decrypting the encrypted data during the boot process using the second decryption key.

8. A method comprising:
detecting an upgrade to a component of a computing device, wherein the computing device comprises encrypted data;
in response to detecting the upgrade and prior to a boot process, deactivating a link between a set of platform configuration register (PCR) values and a first decryption key usable to decrypt the encrypted data;
accessing a second decryption key usable to decrypt the encrypted data during the boot process via an alternative link between a network server and the second decryption key; and
subsequent to the boot process, updating the set of PCR values and linking the updated set of PCR values and the first decryption key.

9. The method of claim 8, wherein accessing the second decryption key via the alternative link comprises using a network connection between the computing device and the network server to access the second decryption key.

10. The method of claim 8, wherein linking the updated set of PCR values and the first decryption key comprises configuring a trusted platform module to provide access to the first decryption key upon determining that hashed PCR values associated with another boot process match the updated set of PCR values.

11. The method of claim 8, wherein deactivating the link between the set of PCR values and the first decryption key comprises preventing access to the first decryption key during the boot process.

12. The method of claim 8, further comprising determining that the upgrade to the component will affect at least one PCR value of the set of PCR values.

13. The method of claim 8, wherein upgrade is a firmware upgrade, and wherein detecting the firmware upgrade comprises:
accessing at least one setting of a firmware environment associated with the computing device; and
determining, based on the at least one setting, that the firmware upgrade is scheduled for execution during the boot process.

14. The method of claim 8, further comprising decrypting the encrypted data during the boot process using the second decryption key.

15. A non-transitory computer-readable medium comprising instructions that are executable by a processing device for causing the processing device to perform operations comprising:

detecting an upgrade to a component of a computing device, wherein the computing device comprises encrypted data;

in response to detecting the upgrade and prior to a boot process, deactivating a link between a set of platform configuration register (PCR) values and a first decryption key usable to decrypt the encrypted data;

accessing a second decryption key usable to decrypt the encrypted data during the boot process via an alternative link between a network server and the second decryption key; and subsequent to the boot process, updating the set of PCR values and linking the updated set of PCR values and the first decryption key.

16. The non-transitory computer-readable medium of claim 15, wherein the operation of accessing the second decryption key via the alternative link comprises using a network connection between the computing device and the network server to access the second decryption key.

17. The non-transitory computer-readable medium of claim 15, wherein the operation of linking the updated set of PCR values and the first decryption key comprises configuring a trusted platform module to provide access to the first decryption key upon determining that hashed PCR values associated with another boot process match the updated set of PCR values.

18. The non-transitory computer-readable medium of claim 15, wherein the operation of deactivating the link between the set of PCR values and the first decryption key comprises preventing access to the first decryption key during the boot process.

19. The non-transitory computer-readable medium of claim 15, wherein the operations further comprise determining that the upgrade to the component will affect at least one PCR value of the set of PCR values.

20. The non-transitory computer-readable medium of claim 15, wherein upgrade is a firmware upgrade, and wherein the operation of detecting the firmware upgrade comprises:

accessing at least one setting of a firmware environment associated with the computing device; and determining, based on the at least one setting, that the firmware upgrade is scheduled for execution during the boot process.

* * * * *